United States Patent [19]

Olson et al.

[11] Patent Number: 5,277,936
[45] Date of Patent: Jan. 11, 1994

[54] OXIDE CONTAINING MCRAlY-TYPE OVERLAY COATINGS

[75] Inventors: Walter E. Olson; Dinesh K. Gupta, both of Vernon, Conn.

[73] Assignee: United Technologies Corporation, Hartford, Conn.

[21] Appl. No.: 122,868

[22] Filed: Nov. 19, 1987

[51] Int. Cl.$^5$ .............................................. B05D 1/00
[52] U.S. Cl. ................................. 427/453; 427/201; 427/203; 427/204; 427/205; 427/367; 427/383.7; 427/405; 427/419.3; 427/422; 427/426; 427/427; 427/452; 427/456; 427/576; 427/578; 427/580
[58] Field of Search ............... 427/34, 367, 383.7, 427/405, 419.3, 452, 453, 456, 576, 578, 580, 422, 426, 427, 201, 203, 204, 205

[56] References Cited

U.S. PATENT DOCUMENTS

| | | | |
|---|---|---|---|
| Re. 32,121 | 4/1986 | Gupta et al. | 428/656 |
| 3,436,511 | 4/1969 | Rath | 219/76 |
| 3,542,530 | 11/1970 | Talboom et al. | 29/183.5 |
| 3,597,241 | 8/1971 | Perugini | 106/1 |
| 3,676,085 | 7/1972 | Evans et al. | 29/194 |
| 3,754,903 | 8/1973 | Goward et al. | 75/171 |
| 3,864,093 | 2/1975 | Wolfla | 29/195 |
| 3,918,139 | 11/1975 | Felten | 29/194 |
| 3,928,026 | 12/1975 | Hecht et al. | 75/134 |
| 3,941,903 | 3/1976 | Tucker, Jr. | 427/190 |
| 4,124,737 | 11/1978 | Wolfla et al. | 428/640 |
| 4,180,622 | 12/1979 | Burkhard | 428/564 |
| 4,248,940 | 2/1981 | Goward et al. | 428/633 |
| 4,275,090 | 6/1981 | McComas et al. | 427/34 |
| 4,275,124 | 6/1981 | McComas et al. | 428/564 |
| 4,321,310 | 3/1982 | Ulion et al. | 428/612 |
| 4,446,199 | 5/1984 | Gedwill et al. | 428/639 |
| 4,451,496 | 5/1984 | Gedwill et al. | 427/34 |
| 4,551,064 | 11/1985 | Pask | 415/116 |

FOREIGN PATENT DOCUMENTS

WO87/02333-89  4/1987  World Int. Prop. O. ..... C23C 4/10

OTHER PUBLICATIONS

J R. Rairden and E. M. Habesch—"Low-Pressure-Plasma-Deposited Coatings Formed from Mechanically Alloyed Powders"—Mar. 18, 1981—pp. 353-360 Metallurgical and Protective Coatings.

Primary Examiner—Bernard Pianalto
Attorney, Agent, or Firm—James M. Rashid

[57] ABSTRACT

The oxidation resistance of MCrAlY-type overlay coatings is improved by incorporating small discrete oxide particles into the coating. The particles are preferably yttrium oxide, and the coating is applied by simultaneously plasma spraying MCrAlY-type powder particles and oxide particles onto a substrate in a nonoxidizing atmosphere. Improvements in resistance to rumpling has also been observed in coatings applied according to this invention.

8 Claims, 3 Drawing Sheets

OXIDE CONTAINING MCRAlY-TYPE OVERLAY COATINGS

DESCRIPTION

1. Technical Field

This invention relates to overlay coatings used at high temperatures. In particular, it relates to the MCrAlY-type family of plasma sprayed overlay coatings.

2. Background Art

Improved efficiency in modern industrial and aircraft gas turbine engines is generally achieved by increasing the temperature in the combustor and turbine section of the engine. However, such temperature increases also tend to increase the rate at which the engine components degrade, in particular, due to oxidation and thermal-mechanical fatigue. As a result, the gas turbine engine industry expends a significant effort to improve the high temperature properties of materials used in the hot section of the engine.

Overlay coatings are commonly used throughout the turbine engine industry to protect the surfaces of components such as turbine section blades and vanes from oxidation degradation. They are also used in combination with ceramic coatings to form thermal barrier coating systems used on combustor components. Overlay coatings are applied by techniques such as plasma spraying, sputtering, and physical vapor deposition. Representative of the various types of overlay coatings used on gas turbine section components are the MCrAlY-type family of coatings, where M is nickel, cobalt, iron, or a combination thereof. MCrAlY-type coatings include, but are not limited to, the FeCrAlY coatings described by Talboom et al in U.S. Pat. No. 3,542,530; the NiCrAlY coatings described by Goward et al in U.S. Pat. No. 3,754,903; the CoCrAlY coatings described by Evans et al in U.S. Pat. No. 3,676,085; the NiCoCrAlY coatings described by Hecht et al in U.S. Pat. No. 3,928,026; and the NiCoCrAlY coatings which contain silicon and hafnium, as described by Gupta et al in U.S. Pat. No. Reissue 32,121. MCrAlY-type coatings may also include noble metals and other rare earth metals in combination with or substitution for yttrium, as described by Felton in U.S. Pat. No. 3,918,139. The contents of these patents are incorporated herein by reference.

MCrAlY-type overlay coatings are commonly used in combination with a ceramic coating to form a thermal barrier coating system. See, e.g., U.S. Pat. No. 4,248,940 to Goward et al, also incorporated by reference. Ceramics based on zirconium are usually preferred due to their desirable refractory characteristics and low thermal conductivity. The zirconium is typically stabilized with an oxide such as yttrium oxide, magnesium oxide or cerium oxide. Alumina and silica have also been used as ceramic coatings.

In some gas turbine engine operating environments, prior art MCrAlY-type overlay coatings are found to have inadequate high temperature properties. In particular, they are sometimes observed to oxidize too rapidly, undergo what is sometimes referred to as rumpling, or crack due to thermal-mechanical fatigue. A rumpled coating is macroscopically characterized by an alternating pattern of peaks and valleys, which form when the coating flows, or creeps, at high temperatures. Rumpling is therefore most likely to be observed on overlay coatings applied to rotating engine components like turbine blades. Rumpling is undesired for several reasons, which include: the peaks of the rumpled coating interfere with laminar flow over the coating surface, and result in localized increases in metal temperature and more rapid oxidation of the coating; the peaks also act as crack initiation sites when the coating is operated at high stress conditions; the rough surface has a greater amount of surface area as compared to a smooth surface, thereby increasing the rate at which aluminum can be depleted from the coating.

As a result of the problems observed with prior art overlay coatings, further improvements are needed. The coating of this invention has been shown to exhibit enhanced resistance to oxidation and less tendency to rumple at elevated temperatures. And it has resistance to thermal mechanical fatigue cracking which is equal to or better than prior art coatings.

SUMMARY OF THE INVENTION

This invention is an improved plasma sprayed overlay coating based on the MCrAlY-type family of overlay coatings, and is particularly useful when applied to components used in the hot section (turbine and combustor section) of modern gas turbine engines. The coating is characterized by small diameter, thermodynamically stable oxide particles which are uniformly distributed throughout the thickness of a plasma sprayed coating. The coating is deposited in a low pressure chamber spray (LPPS) process in which the MCrAlY-type powder particles and the oxide particles are injected into a substantially nonoxidizing plasma arc stream from separate and independently controlled powder feeders. One powder feeder supplies metallic particles to the plasma stream, while another feeder supplies oxide particles to the stream. The use of separate feeders insures that a predetermined ratio of metallic to oxide constituents in the coating is achieved, and that the oxide particles are uniformly distributed throughout the coating.

More specifically, the invention coating is based on the MCrAlY-type family of coatings. It consists essentially of, by weight percent, 5–40 Cr, 8–35 Al, 0.2–2 of oxygen active elements selected from the Group III B and rare earth elements, 0–7 Si, 0–2 Hf, 0–12 of a noble metal, 1–8 of discrete oxide particles which are selected from the group consisting of aluminum oxide, Group III B oxides and the rare earth oxides, with the balance made up of nickel, cobalt, or a combination of nickel and cobalt. The oxide particles are preferably yttrium oxide particles within the size range of about 0.5–10 microns. A preferred coating composition is 10–25 Cr, 10–15 Al, 0.2–1.0 Y, 0–7 Si, 0–2 Hf, 1–8 $Y_2O_3$, balance Ni+Co. An even more preferred composition range is 20–24 Co, 15–19 Cr, 11.8–13.2 Al, 0.2–0.6 Si, 0.1–0.4 Hf, 0.4–0.8 Y, 3–7 $Y_2O_3$, balance Ni. The most preferred coating of this invention consists essentially of about 22 Co, 17 Cr, 12.5 Al, 0.25 Hf, 0.4 Si, 0.6 Y, 5 $Y_2O_3$, balance Ni.

The invention coating is preferably applied to a thickness of about 50 to 250 microns (2 to 10 mils) and then peened and heat treated. The coatings are useful as an oxidation resistant overlay coating and as a bond coating in thermal barrier coating systems. Other features and advantages of the invention will be apparent from the following drawings and detailed description of the invention.

BEST MODE FOR CARRYING OUT THE INVENTION

Figure 1:
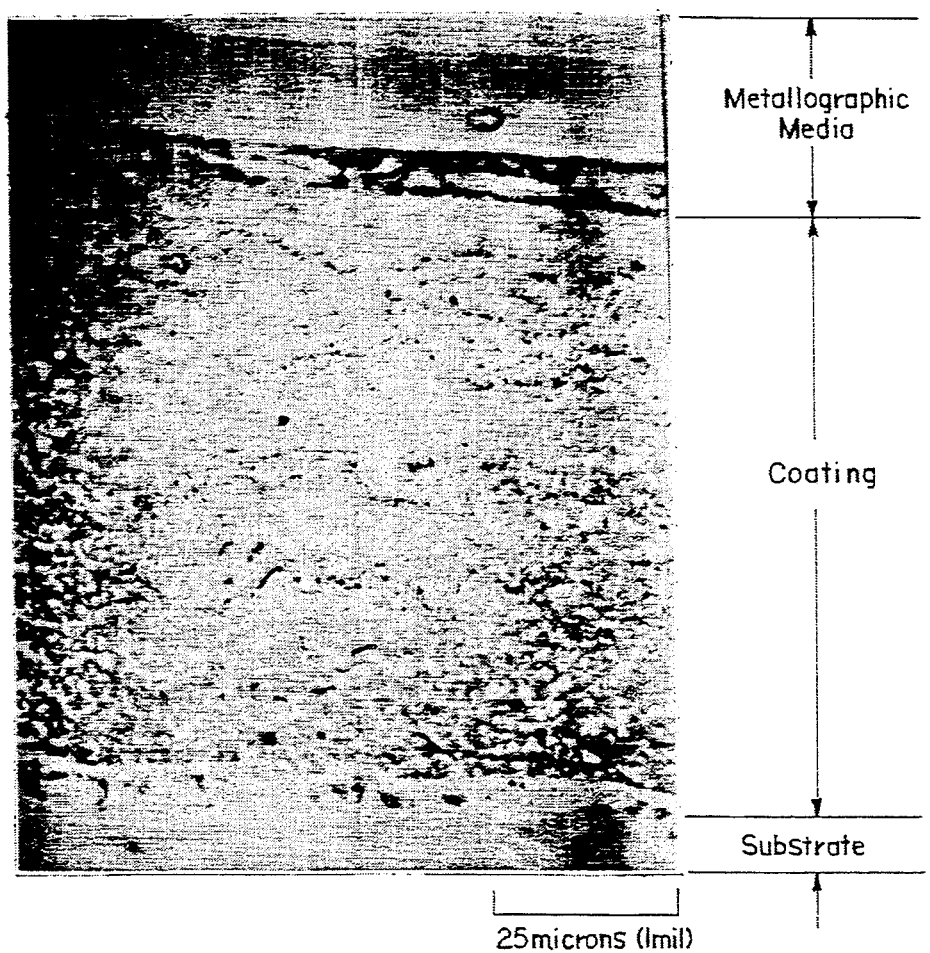
FIG. 1 is a photomicrograph of an overlay coating in accordance with the invention.

The invention coating is particularly suited for use on components which operate in the turbine and combustor section of gas turbine engines. In modern gas turbine aircraft engines, the gas stream temperature in the turbine and combustor section typically exceeds 1,425° C. (2,600° F.); tests have shown that the properties of the invention coating in this temperature range are equal to or better than those of the prior art coatings.

The invention coating is applied by a low pressure plasma spray (LPPS) process, sometimes also referred to as a vacuum plasma spray process. The coating is applied at reduced oxygen levels, which minimizes oxidation of the MCrAlY powder particles while they are heated in the plasma spray stream; as a result, the as-sprayed coating is free from the lamellar type oxides and other impurities which are typically observed in coatings applied with the more common air-spray techniques. The only oxides present in the coating are the small, discrete oxide particles which are uniformly distributed throughout the coating.

After spraying, the invention coating is preferably peened and heat treated to optimize properties. The peening step eliminates any as-sprayed porosity in the coating, and the heat treating step improves the bond between the coating and the substrate as a result of diffusion between the coating and substrate.

The thickness of the coating is primarily dependent upon the application in which the coated component is used. When applied to turbine section components such as blades and vanes, the coating thickness should be in the range of about 75 to 175 microns (3 to 7 mils). When applied to combustor section components such as combustion chambers or combustion chamber liners as a bond coating in a thermal barrier coating system, the invention coating thickness should be in the range of about 125 to 200 microns (5 to 8 mils).

The composition of the invention coating is based on the MCrAlY-type family of compositions. In particular, it is based primarily on the hafnium and silicon modified composition described in commonly assigned U.S. Pat. No. Re 32,121 to Gupta et al. Broadly speaking, the invention coating contains, by weight percent, 5-40 Cr, 8-35 Al, 0.2-2 of the Group III B and rare earth elements, 0-7 Si, 0-2 Hf, 0-12 of a noble metal, 1-8 of the oxides selected from the group consisting of aluminum oxide, Group III B oxides and rare earth oxides, with the balance made up of nickel, cobalt, or a combination of nickel and cobalt. A preferred coating composition range is 10-25 Cr, 10-15 Al, 0.2-1 Y, 0-7 Si, 0-2 Hf, 1-8 $Y_2O_3$, balance Ni+Co. An even more preferred coating composition range is 20-24 Cr, 15-19 Cr, 11.8-13.2 Al, 0.2-0.6 Si, 0.1-0.4 Hf, 0.4-0.8 Y, 3-7 $Y_2O_3$, balance Ni. The most preferred overlay coating composition according to this invention is 22 Co, 17 Cr, 12.5 Al, 0.25 Hf, 0.4 Si, 0.6 Y, 5 $Y_2O_3$, balance Ni.

The oxide particles which are present in the sprayed coating must be of a particular composition and size in order to obtain the best coating properties. In particular, the oxides must be thermodynamically stable at the temperatures which the coatings are used at, which are usually at least about 1,095° C. (2,000° F.). Thermodynamic stability of the oxide particles is required to avoid marked changes in the characteristics of the particles during the life of the coating. If such characteristics would change, the beneficial effects of the particles on coating properties will be lost. Of primary concern is that the oxide particles not react with the large reservoir of aluminum (8-35 weight percent) in the coating. For example, the chemical reduction of the oxides by aluminum is one such reaction which must be avoided; accordingly, the oxide particles must have a free energy of formation, at the coating deposition and use temperatures, which is equal to or less than the free energy of formation of $Al_2O_3$. Since aluminum oxide and yttrium oxide both meet this requirement, and are readily available and safe to work with, $Al_2O_3$ and $Y_2O_3$ are the preferred oxides in the invention coating.

The oxide particles should be as small as possible, within the limits of the ability to spray them in the low pressure plasma spray process. Particles in the subsieve size range of about 0.5-10 microns (0.02-0.4 mils) are preferred, with the range of 1.0-5.0 microns (0.04-0.2 mils) being most preferred. Larger particles are not useful in the practice of this invention, since they would have a tendency to act as fatigue initiation sites either alone or in combination with other oxide particles, and would debit the mechanical properties of the coating and the substrate to which the coating is applied. Particles within the preferred range of 0.5-10 microns improve the strength of the coating, as evidenced by the improved resistance to rumpling and thermal fatigue cracking. Furthermore, the presence of the particles improves the coating oxidation resistance, as shown by cyclic oxidation tests discussed below.

The benefits due to the presence of the oxide particles are greatest when the particles are uniformly distributed throughout the coating. Such uniformity is achieved by a plasma spray process in which the oxide particles and MCrAlY-type powders are each separately supplied to the plasma stream: at least one powder feeder supplies metallic particles to the plasma stream, while at least one other feeder supplies oxide particles to the stream. The apparatus may be modified so that the separate feeders supply the powders to an intermediate mixing chamber which then delivers the powder to the stream. See U.S. Pat. No. 3,912,235 to Janssen; other apparatus known to those skilled in the art for delivering different powder types (i.e., powders having different compositions and sizes) to a plasma stream may also prove useful. Separate and independently controllable powder feeders insure that fixed amounts of oxide particles and MCrAlY-type particles are continually injected into the plasma stream, which results in a coating with a known ratio of metallic to oxide constituents. In the practice of this invention, the metallic powder feed rate should be about 10 to 20 times (by volume) as great as the oxide powder feed rate.

The invention will be better understood by reference to the following example, which is meant to illustrate its features without limiting its scope. In this example, an Electro-Plasma Incorporated (Irvine, California, USA) Model 005 low pressure chamber spray apparatus was used to apply the invention coating to nickel base superalloy specimens having a nominal composition of 10Cr-5Co-4W-1.5Ti-12Ta-5Al-balance nickel. Prior to applying the coating, the samples were cleaned by the reverse transfer arc (RTA) process common in the industry.

The MCrAlY-type powder particles used to make the invention coating had a nominal composition, by weight percent, of 22Co-17Cr-12.5Al-0.25Hf-0.4Si-0.6Y-balance nickel. They were co-sprayed in a low pressure chamber spray process with yttrium oxide powder particles. The metallic powder particles were generally spherical in shape, having a diameter of about 10 to 37 microns (0.4 to 1.5 mils). The oxide particles were generally angular in shape, having a diameter of about 1.0 to 5.0 microns (0.04 to 0.20 mils).

The metallic and oxide powder particles were delivered to the plasma stream by separate powder feeders; the volume ratio of metallic powder particles to oxide particles was about 10 to 1 in one test, and about 20 to 1 in another test during the spray process. The pressure within the plasma chamber was maintained at about 50 millimeters mercury, and the voltage and current was about 50 volts and 1,520 amps, respectively. A gas mixture of about 85% argon-15% helium was the arc gas.

The coatings in both tests were applied to a thickness of about 125 microns (5 mils). After shot peening to an intensity of 17-19N (as measured by conventional Almen test procedures) and heat treatment in a protective atmosphere at about 1,080° C. (1,975° F.) for four hours, metallographic examination revealed a coating microstructure similar to that shown in FIG. 1. The coatings were nearly fully dense, and the small black oxide particles were substantially uniformly distributed throughout the coating.

Figure 2:
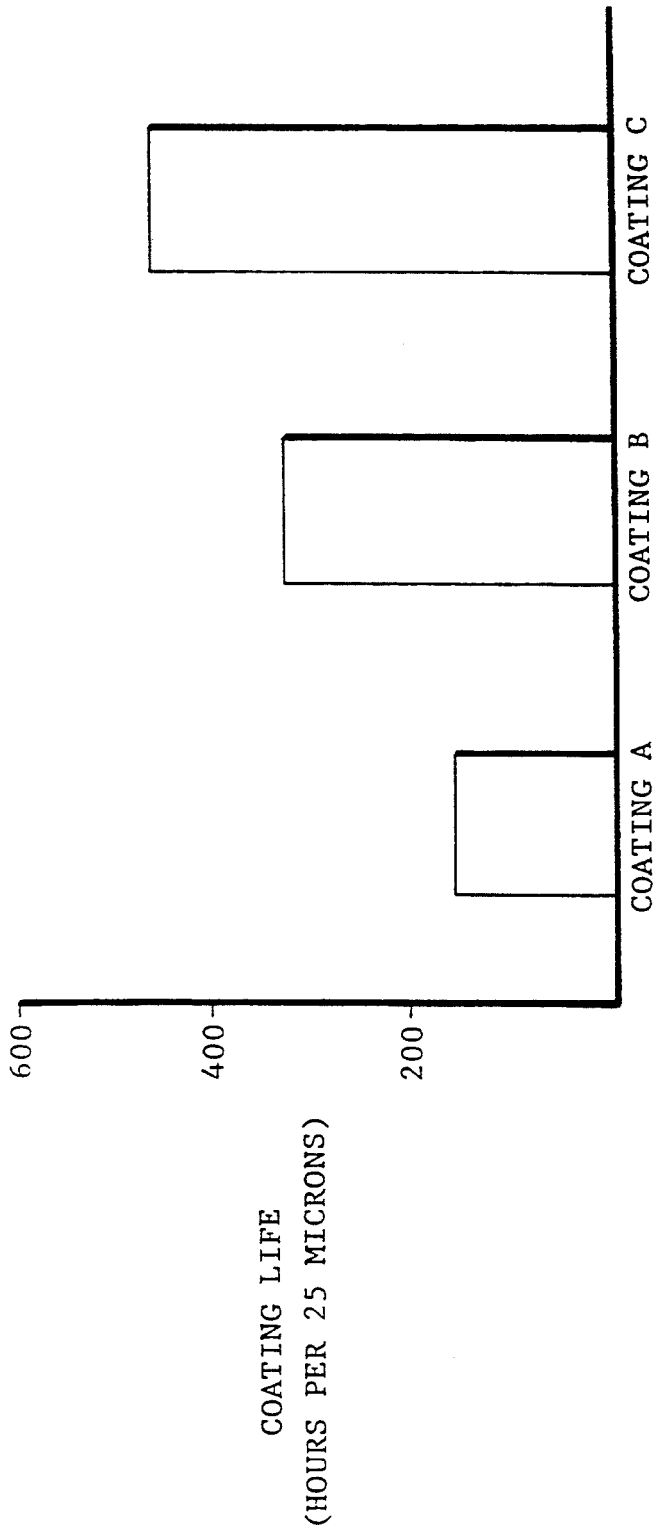
FIG. 2 shows that the invention coating has greater resistance to oxidation degradation as compared to overlay coatings of the prior art.

Cyclic oxidation tests were conducted to compare the properties of the invention coatings to prior art MCrAlYtype coatings which were also applied by the LPPS process. In these tests, the coated specimens all had a nominal coating thickness of about 125 microns (5 mils) and had been peened and heat treated as described above. The specimens were attached to a fixture which rotated at a high speed in a flame produced by the combustion of jet aircraft grade fuel. The specimens were heated in the flame to about 1,150° C. (2,100° F.) for about 57 minutes, and then removed from the flame and force air cooled for about 3 minutes. All specimens were periodically inspected and the life of the coatings were measured in terms of the number of hours to oxidize 25 microns of the coating thickness. Results of these tests are shown in FIG. 2, which shows the substantial improvement in oxidation resistance of the invention coating relative to the prior art coatings. FIG. 2 also shows the significant improvement in oxidation life when the NiCoCrAlY+Hf+Si coating was modified to include $Y_2O_3$ particles in accordance with this invention. The NiCoCrAlY+Hf+Si coating composition (unmodified) is considered to be one of the most oxidation resistant plasma sprayed overlay coatings available to industry. The improvement in oxidation resistance obtained by the addition of about 5 weight percent $Y_2O_3$ particles is very significant to the gas turbine engine industry.

Figure 3:
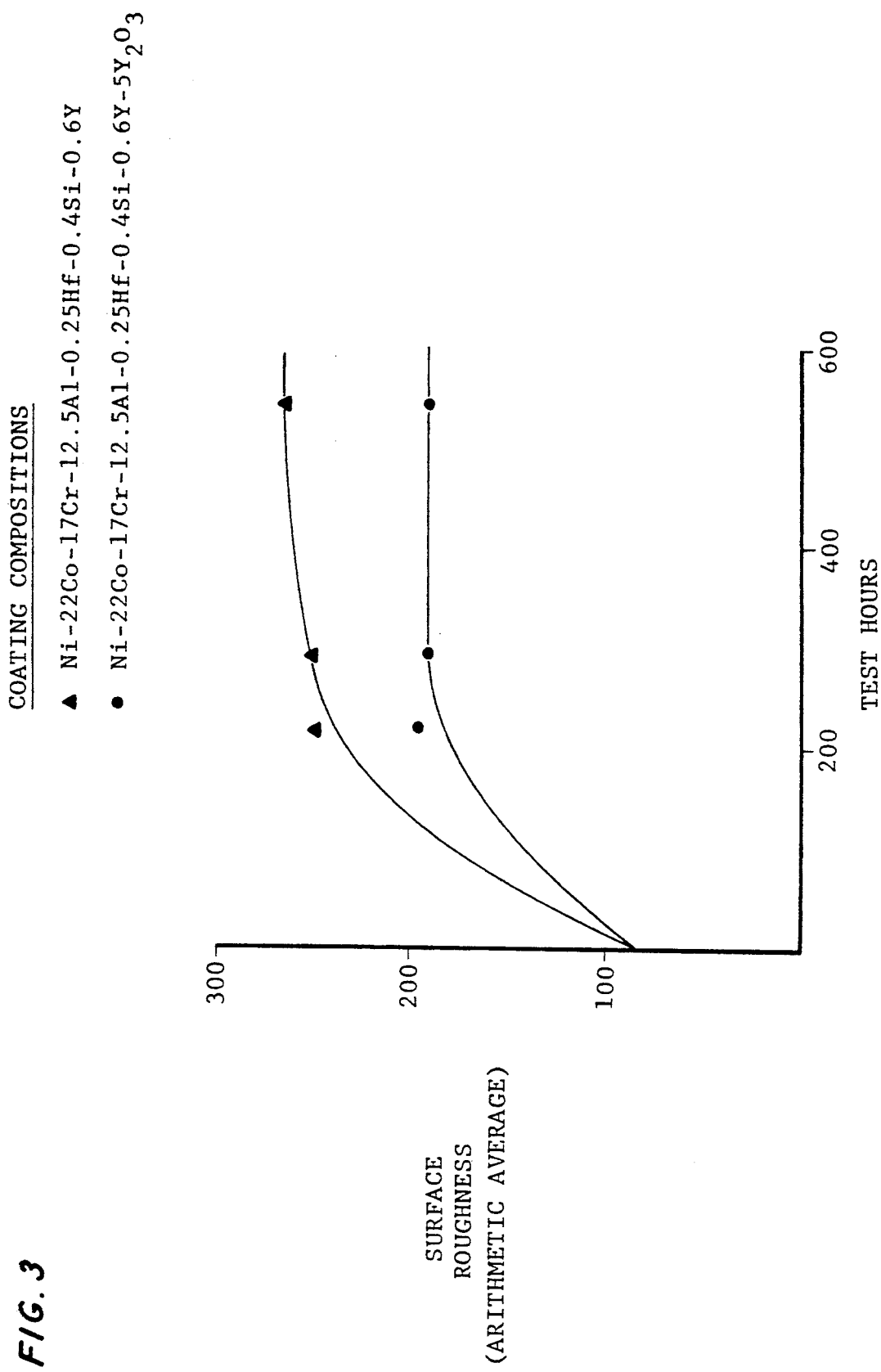
FIG. 3 shows that the invention coating has greater resistance to rumpling as compared to overlay coatings of the prior art.

The cyclic oxidation tests also indicated that the invention coatings had greater resistance to rumpling than did the prior art coatings, as shown in FIG. 3. In the figure, rumpling is reported in terms of surface roughness, as measured by conventional profilometer techniques. The more rumpled coating has a higher surface roughness measurement. The rotation of the coated samples in the flame in combination with the cycling temperature of the oxidation test imparted sufficient strain to produce creep (rumpling) of the coating. These tests showed that the invention coating exhibited markedly improved resistance to rumpling compared to the prior art coatings. Reduced rumpling also corresponds to better resistance to thermal fatigue cracking.

Although this invention has been shown and described with respect to detailed embodiments thereof, it will be understood by those skilled in the art that various changes in form and detail thereof may be made without departing from the spirit and scope of the claimed invention.

We claim:

1. A method for depositing an overlay coating onto the surface of a nickel or cobalt base article, comprising the steps of generating a plasma arc stream in a substantially nonoxidizing atmosphere, injecting metal powder particles from a first powder feeder containing said metal particles into the stream and injecting oxide particles from a second powder feeder containing said oxide particles into the stream, wherein the stream impacts the metal and oxide particles onto the article surface, and wherein the metal particles consist essentially of, by weight percent, 5-40 Cr, 8-35 Al, 0.2-2 of an oxygen active element selected from the Group III B and rare earth elements, 0-7 Si, 0-2 Hf, 0-12 of a noble metal, with the balance nickel and cobalt, and said oxides are selected from the group consisting of aluminum oxide, the Group III B oxides, and the rare earth oxides and are about 0.5-10 microns in size, and wherein the metal particles are injected into the stream at a volume rate which is between about 10 to 20 times the rate at which the oxide particles are injected into the stream.

2. The method of claim 1, further comprising the step of peening the coating to close as-sprayed porosity, and then heat treating the coated article to improve the bond between the coating and the article surface.

3. The method of claim 2, wherein the metal powder particles consist essentially of 10-25 Cr, 10-15 Al, 0.2-1 Y, 0-7 Si, 0-2 Hf, balance Ni+Co.

4. The method of claim 2, wherein the metal powder particles consist essentially of 20-24 Co, 15-19 Cr, 11.8-13.2 Al, 0.2-0.6 Si, 0.1-0.4 Hf, 0.4-0.8 Y, and wherein the oxide particles are yttrium oxide.

5. The method of claim 1, further comprising the step of plasma spraying an oxide stabilized ceramic coating onto the surface of the oxide containing metallic coating.

6. A method for improving the oxidation resistance and resistance to rumpling of an overlay coating composition which consists essentially of, by weight percent, 20-24 Co, 15-19 Cr, 11.8-13.2 Al, 0.2-0.6 Si, 0.1-0.4 Hf, 0.4-0.8 Y, balance nickel, comprising the steps of plasma spraying powder particles having said composition in a substantially nonoxidizing environment with yttrium oxide particles having a size range of about 0.5-10 microns, wherein the metal particles are injected into the stream at a volume rate which is between about 10 to 20 times the rate at which the oxide particles are injected into the stream.

7. The method of claim 6, further comprising the step of densifying the coating by peening then heat treating the coated article.

8. The method of claim 7, wherein the coating is peened at an intensity of about 17-19N and the article is heat treated at about 1,080° C. for four hours.

* * * * *